United States Patent [19]

Bevard

[11] 3,719,007
[45] March 6, 1973

[54] WIRE STRIPPER WHEEL FOR TOUGH PLASTIC

[75] Inventor: Ralph E. Bevard, Fayetteville, N.Y.
[73] Assignee: The Eraser Company, Inc., Syracuse, N.Y.
[22] Filed: Oct. 2, 1971
[21] Appl. No.: 186,012

[52] U.S. Cl. ................................51/207, 51/297
[51] Int. Cl. ........B24d 5/00, B24d 7/00, B24d 11/00
[58] Field of Search........51/295, 297, 207, 401, 358, 51/376, 204; 15/179–181, 230.13, 230.12, DIG. 3, DIG. 6

[56] References Cited
UNITED STATES PATENTS

| 2,698,504 | 1/1955 | Lotz | 51/297 |
| 2,763,105 | 9/1956 | Feeley | 51/207 |
| 2,795,002 | 6/1957 | Davies | 51/297 X |
| 3,027,247 | 3/1962 | Gagarine | 51/297 |

Primary Examiner—Othell M. Simpson
Attorney—Bruns & Jenney

[57] ABSTRACT

A wire stripper wheel, of the type having a plurality of layers of woven glass fibers impregnated with and bonded together with a rubber substance, has an additional layer at each end formed with a hard bonding substance such as epoxy resin or polyester. The hard layers cut through tough plastic insulation and hold the glass fibers compressed so they do not fray endwise of the wheel.

3 Claims, 6 Drawing Figures

PATENTED MAR 6 1973　　3,719,007
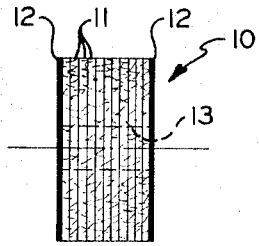
FIG. 1
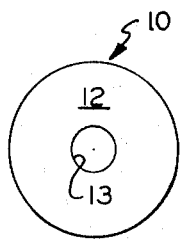
FIG. 1A
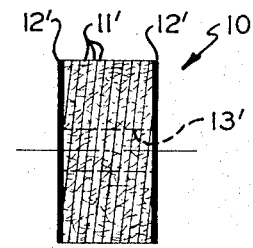
FIG. 2
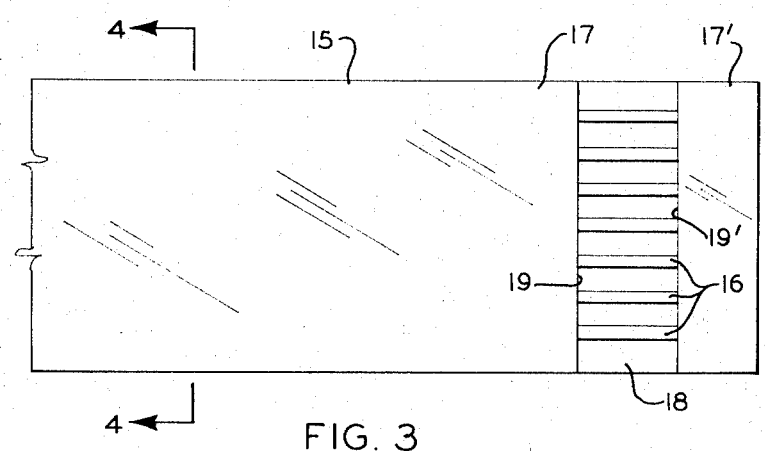
FIG. 3
FIG. 4
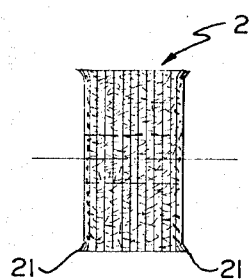
FIG. 5
(Prior Art)
INVENTOR.
RALPH E. BeVARD
BY
Bruns & Jenney
ATTORNEYS

WIRE STRIPPER WHEEL FOR TOUGH PLASTIC

BACKGROUND OF THE INVENTION

This invention relates to fiberglass wheels for wire stripping machines and more particularly to a wheel adapted to remove tough plastic insulation.

Wire stripper wheels comprising a plurality of disks of woven fiberglass fibers impregnated with a resilient material such as rubber and bonded together have long been used to grind away the insulation on electrical wires. The grinding surface of such wheels show protruding fiber ends which are highly effective in removing the insulation but which do not scratch or mar the copper wire itself.

Recently developed wires have a relatively thin coating of exceedingly tough plastic insulation such as fluorocarbon resin (Teflon), or polyimide, polyimide-amide, or polyamide-imide resins which usually have to be removed using blades, heat or some similar technique. Each of these resins are highly heat resistant or do not melt but merely char at critical heats ranging from 500° to 800° F. Ordinary fiberglass wheels wear out rapidly when used on such insulation and the insulation at the edge of the cut or buffed zone is not cleanly cut but is tapered as the edges of the wheel wear more rapidly than the center.

SUMMARY OF THE INVENTION

The present invention comprises the disk at each end of the wheel being impregnated or bonded to the next disk by a relatively hard bonding material such as epoxy resin or a polyester. This hard disk cuts through the tough insulation like a knife, leaving a clean vertical cut, and holds the fibers of the other layers from spreading apart thereby increasing the useful life of the wheel.

BRIEF DESCRIPTION OF THE DRAWING

FIG. 1 is a diagrammatic side-elevational view of a wheel embodying the invention;

FIG. 1A is an end-elevational view thereof;

FIG. 2 is a view similar to FIG. 1 of a modified form of wheel in which the layers are at a small angle to the plane normal to the axis of the wheel;

FIG. 3 is a fragmentary plan view of a flat wire cable showing a portion stripped of insulation;

FIG. 4 is a sectional view on the line 4—4 of FIG. 3; and

FIG. 5 is a view similar to FIG. 1 of a prior art wheel after use in stripping a cable having tough insulation.

DESCRIPTION OF THE PREFERRED EMBODIMENTS

Referring to FIGS. 1 and 2, the wheel 10 comprises a plurality of layers 11 of woven fiberglass disks impregnated and bonded together with a resilient material such as rubber. It will be understood that FIG. 1 is diagrammatic in that there are no distinct lines of division between the layers, as shown, and the layers are only distinguishable to the eye by the linear arrangement of protruding fibers, diagrammatically shown in the Figure as fine stippled lines, on the round grinding surface of the wheel.

At each end of the wheel 10 is a layer 12 impregnated with a hard non-resilient bonding substance such as epoxy resin or polyester, diagrammatically shown as black in the Figure. An axially extending bore or hole 13 is provided at the center of wheel 10 for the spindle of the wire stripper machine on which the wheel is used.

In FIG. 2 a known modified form of wheel, called a "wobble" wheel, is similarly shown, the layers 11' being disposed at a small angle to the plane normal to the axis of the wheel. The end layers 12' are impregnated with or formed of hard bonding substance according to the invention similar to that used for layers 12 of wheel 10.

The layers 12 and 12' are preferably bonded to the layers 11 and 11' during construction of the wheel but may be separate layers or disks secured to the layers 11 and 11' by the means which secure the wheels on their spindle. Layers 12 and 12' preferably contain fabric fiberglass but improved results have been obtained with wheels in which the end layers contain no fibers. Improved results have been obtained for a short time by merely dipping the ends of prior art wheels in the epoxy resin or polyester (alkyd) bonding material and curing.

Referring to FIGS. 3 and 4 a wire cable 15 is shown as a flat cable with a plurality of rectangular wires embedded in a tough so-called "hard plastic" insulation 17. At one end of FIG. 3, a strip 18 is shown as having been stripped of insulation by passing a rotating wheel 10 or 10' across the upper surface of the strip 15, and end 17' having been left unstripped for holding the wires 16 in position. It will be understood that the rotating wheel may be passed over the strip or the strip may be secured to a table which is passed under the fixed wheel. Stripping machines of both types are known and the motion may be manually or automatically produced. Other machines are known in which the strip 15 may be passed between upper and lower spaced wheels for simultaneously stripping the insulation from the bottom surface of the strip as well as from the top surface.

It will be noted that the edges 19 and 19' of strip 18 are cleanly cut by the layers 12 or 12' without nicking the wires 16 and the wheels 10 or 10' are known to dramatically outlast prior art wheels put to the same use.

A prior art wheel 20 used for stripping "hard" insulation is shown diagrammatically in FIG. 5. The end edges 20 are shown as having broken down with frayed fibers extending edgewise. The "hard-bonded" layers 12 and 12', besides cutting like a knife through the insulation, contain and compress the fibers of adjacent layers to prevent this endwise fraying which accounts for the improvement in the working life of the wheel.

I claim:

1. A wire stripper wheel for stripping tough plastic insulation from electrical cables comprising a plurality of disk-like layers of woven glass fibers impregnated and bonded together with a resilient material to form a wheel, the end layers of the wheel being impregnated with and bonded to the other layers by a hard non-resilient plastic resin.

2. In a wire stripper wheel for stripping tough plastic insulation from electrical cables, the wheel being of the type having a plurality of disk-like layers of woven glass fibers impregnated and bonded together with a resilient material to form a wheel having an axially extending bore, the improvement comprising an additional bonding substance.

3. The wheel defined in claim 2 in which the hard, non-resilient bonding substance is chosen from a group consisting of epoxy resin and polyester.

* * * * *

UNITED STATES PATENT OFFICE
CERTIFICATE OF CORRECTION

Patent No. 3,719,007     Dated  March 6, 1973

Inventor(s)   Ralph E. BeVard

It is certified that error appears in the above-identified patent and that said Letters Patent are hereby corrected as shown below:

In Claim 2, Col. 2, lines 66 & 67, "bonding substance" should read -- layer at each end formed with a hard non-resilient bonding substance. --

Signed and sealed this 20th day of November 1973.

(SEAL)
Attest:

EDWARD M. FLETCHER, JR.        RENE D. TEGTMEYER
Attesting Officer              Acting Commissioner of Patents